United States Patent Office 3,440,223
Patented Apr. 22, 1969

3,440,223
POLYURETHANES AND METHOD OF MAKING
Warren K. Pierce, Tallmadge, Ohio, assignor to The Goodyear Tire & Rubber Company, Akron, Ohio, a corporation of Ohio
No Drawing. Continuation of application Ser. No. 344,545, Feb. 13, 1964. This application July 17, 1967, Ser. No. 654,001
Int. Cl. C08g 41/02, 22/04, 51/60
U.S. Cl. 260—75  7 Claims

ABSTRACT OF THE DISCLOSURE

A method of producing a polyurethane composition by forming a reaction mixture of an organic polyisocyanate, a reactive hydrogen containing polymeric material, a primary diamine and a secondary diamine of the formula

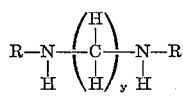

where $y$ is an integer having a value of 1 to about 10 and R is an alkyl radical having from 8 to 30 carbon atoms and reacting to cure said composition as a finished article such as a film, and to said composition.

---

This is a continuation of application Ser. No. 344,545, filed Feb. 13, 1964.

This invention relates to a method of making polyurethane composition and said composition. More specifically, this invention relates to a method for stabilizing polyurethane compositions having a large surface area relative to its volume and to said composition per se.

Polyurethane compositions prepared by reaction of an organic polyisocyanate and a reactive hydrogen containing polymeric material which has been crosslinked with a poly functional monomeric substance are well known and are widely used. It is also well known that polyurethane compositions of this sort exhibit certain undesirable properties such as hydrolysis of the polyesterurethanes and degradation when exposed to sunlight and normal atmospheric conditions.

It is an object of this invention to provide a method for stabilizing polyurethane compositions and to provide said stabilized polyurethane products.

The object of this invention may be accomplished by adding to the polyurethane liquid reaction mixture or having present in said mixture a secondary diamine of the formula

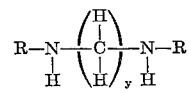

where $y$ has the values of 1 to about 10 with the preferred diamines being those where $y$ is 3 and 4 and R is an alkyl radical containing from about 8 to 30 or more carbon atoms, for volatile reasons and oxidation resistance, the saturated radicals having 16 to 20 carbon atoms are desired with the 18 carbon atom radical being the preferred one, then reacting the liquid reaction mixture to obtain cured polyurethane compositions having the desired shape and configuration. Normaly about a half to 8 parts of the secondary diamines of the above formula are used per hundred parts of the reactive hydrogen containing polymeric material present in the liquid polyurethane reaction mixture. The preferred amount of the secondary diamine is about 1 to about 3 parts. It should be noted that the amount of secondary diamine used may be varied to determine the pot life of the reaction mixture.

It should be appreciated that the reactive hydrogen containing polymeric materials are generally divided into the broad classes of polyester polyols and the polyether polyols with the polyester amides being considered by some people as a special case of the polyester materials.

Representative members of the reactive hydrogen containing polymeric materials belonging to the above classes which are useful in this invention are the polyester polyols prepared by reacting the aliphatic polycarboxylic acids such as oxalic, malonic, succinic, glutarate, adipic, suberic, sebacic, and azalaic with a polyol such as a glycol. Also the unsaturated aliphatic polycarboxylic acids such as maleic and fumaric may be used.

In general, by the term "aliphatic polycarboxylic acid" we mean those carboxylic acids having from 2 to about 20 carbon atoms and preferably about 6 to 12 with the number of carboxyl groups varying from about 2 to 3 and in some cases as high as 4 or 5. Also, the aromatic polycarboxylic acids may be used.

Representative examples of these aromatic polycarboxylic acid are phthalic, terephthalic and isophthalic acid.

These polycarboxylic acids are reacted with glycols or polyols to form polyesters containing at least 2 hydroxyls though for some uses some triols and higher may be used to stiffen the film. Normally, where a solid polyurethane is to be formed it is preferred that the acid number of the polyester be relatively low, normally less than about 10 and preferably less than 1.

Representative examples of the polyols useful in the preparation of the polyesters are ethylene glycol, propylene glycol, tetramethylene glycol, pentamethylene glycol, decamethylene glycol, trimethylol propane, triethylol propane, glycerine, pentaerythritol, hexane triol, sorbitol and related polyols having from 2 to about 10 carbon atoms and containing from 2 to 8 hydroxyls.

Representative of the hydroxyl terminated polyethers useful in this invention are polyethylene glycol, polypropylene glycol, polytetramethylene ether glycol and the corresponding polyols having 3, 4, 5 and higher hydroxyls formed by the condensation of alkylene oxides containing from 2 to about 10 or more carbon atoms on a nucleus generating material such as trimethylol propane, glycerine, hexane triol, pentaerythritol and sorbitol. In general, where elastomeric polyurethanes are prepared it is the practice to use a reactive hydrogen containing polymeric material having a molecular weight of about 500 to about 8,000 with the preferred molecular weight range being about 1,500 to 3,000. Also, those skilled in the art appreciate that the use of appreciable amounts of tri- and higher functional polyols lead to appreciable chain crosslinking and certain properties where as the use of essential difunctional polyols yields a material having other properties.

Any suitable organic polyisocyanate may be utilized in the process of this invention, such as, for example, hexamethylene diisocyanate, undecamethylene diisocyanate, dodecamethylene diisocyanate and 3,3'-diisocyanate dipropylether; cyclopentylene-1,3-diisocyanate, cyclohexylene-1,4-diisocyanate, the tolylene diisocyanates, the xylylene diisocyanates, 4,4'-diphenylmethane diisocyanate, 2-nitrodiphenyl-4,4'-diisocyanate, 4,4'-diphenyl propane diisocyanate, p-isocyanato benzyl isocyanate, m-phenylene diisocyanate, p-phenylene diisocyanate, naphthylene-1,4-diisocyanate, 3,3'-dimethyl-4,4'-diphenylene-diisocyanate, p,p',p''-triphenyl methane triisocyanate and diphenyl-4,6,4'-triisocyanate, the polyaryl polyisocyanates and the polyalkylaryl polyisocyanates. The aromatic diisocyanates are, however, preferred. The organic polyisocyanates are used in excess, usually at least about 1.1 mols and higher for each mol of reactive hydrogen-containing polymeric material. The preferred range generally is about 1.5 to about 2 mols of polyisocyanate based on the reactive hydrogen-containing polymeric material. The excess polyisocyanate is reacted with a suitable crosslinking material such as water, glycols and primary diamines. Normally the crosslinker is used in an amount equivalent to the excess polyisocyanate. When water is used it should be appreciated that the resulting product will be porous unless steps are taken to remove the carbon dioxide generated in situ. Where the glycols and diamines are used as the crosslinking agent, the resulting product will be a homogeneous plastic. The preferred glycol for use as a crosslinking agent is butane diol, although representative examples of those listed for making the polyesters may be used, too.

The aromatic diamines useful in this invention are used in the amount of about 0.1 to about .9 mol per mol of excess organic polyisocyanate over that equivalent to the polyester or polyether.

Preferred results are obtained when the amount of diamine is about 0.3 to 0.8 mols based on the excess organic polyisocyanate. Representative examples of suitable diamines where conventional techniques are to be used, are the so-called slow diamines such as methylene bis-(ortho-chloroaniline), ortho-dichlorobenzidine, 4,4'-bis (amino phenyl) sulfone. Representative examples of suitable fast diamines are 4,4'-methylene dianiline, methyl tolidine, tolylene diamine, o-tolidine, o-dianisidine. The fast diamines preferably are dissolved in a suitable solvent before use such as the low boiling hydrocarbons and ketones.

The term fast and slow diamines refers to the time required for a boiling molar solution of the diamine to develop a turbidity when mixed with a half molar boiling solution of the polyisocyanate. Where methylene chloride is the solvent a fast diamine develops a turbidity in at least 25 seconds.

The following examples illustrate the invention without, however, limiting it (all parts are by weight unless otherwise indicated):

EXAMPLE I

A polyurethane film was prepared by casting a liquid polyurethane reaction mixture into a mold and drawing the film down to the desired thickness with a suitable doctor blade. The liquid polyurethane reaction mixture was prepared as follows:

Fourteen hundred (1,400) parts of a polyurethane prepolymer were prepared by reacting 2 mols of toluene diisocyanate with 1 mol of a mixture containing 80% by weight of polyethylene adipate and 20% by weight of polypropylene adipate. To this prepolymer 14 parts of a high molecular weight viscous petroleum oil was added. Then 140 parts of methylene bis (ortho-chloroaniline) and 0.8 part of a hexanetriol solution containing 33% by weight of triethylene diamine was added and mixed in the prepolymer. Then the prepolymer was dissolved in 60 parts of dimethyl formamide which contained 21 parts of a commercial, dialkyl diamine product to obtain the liquid polyurethane reaction mixture. The dialkyl diamine product was prepared by alkylating propylene diamine to obtain a product having 30% of the alkyl radicals containing 16 carbon atoms and 70% containing 18 carbon atoms. The resulting liquid polyurethane reaction mixture was then cast into a mold and doctored to obtain a film of the desired thickness upon curing. Also, it was observed the resulting film was more uniform in thickness as if the secondary diamine was functioning as a leveling agent.

EXAMPLE II

Two thousand parts of the prepolymer of Example I was dissolved in a mixture of 600 parts of Cellosolve acetate and 600 parts of methyl ethyl ketone. Then 100 parts of a 10% by weight solution of Cellulose acetate butyrate in Cellosolve acetate was added to the methyl ethyl ketone solution of the prepolymer followed by 35 parts of the commercial dialkyl diamine of Example I. Then 192 parts of methylene bis (ortho-chloroaniline) was added and intimately mixed in the methyl ethyl ketone solution of the prepolymer. This product was then cast upon a moving belt which passed under a doctor blade to pull the cast film down to its desired thickness about 0.001 to 0.003 inch; some were as high as 0.008.

EXAMPLE III

A hundred parts of the prepolymer of Example I was mixed with a mixture of 10 parts of carbon black and 20 parts of dibutyl phthalate. Then to this mixture a second mixture was added. The second mixture consisted of 10 parts of methylene bis-orthochloroaniline, 10 parts of a mixed adipate of ethylene and propylene glycol and 2.3 parts of a dialkyl propane diamine whose alkyl radicals contained from 16 to 18 carbon atoms and were essentially free of unsaturation. Thin sheets were cast of this material and then cured by reacting at about 150° C. for about 2 hours. It should be noted the presence of the dialkyl propane diamine hasten the cure of the film to a tack free state and thus would permit faster speeds on a continuous film machine.

EXAMPLE IV

The cured films from Examples 1–3 were exposed in a Fadeometer for 500 hours after which each sample of each film were submitted for color, haze and light transmission analysis and it was found that the films prepared containing the dialkyl diamine resisted discoloration and decomposition better than the control which did not contain the dialkyl diamine. Specific color values for the film of Example I as compared with a control which contained no dialkyl diamines as determined on a Hunter Color Difference Meter, made under U.S. 2,574,264, is shown in the table below:

TABLE 1

| Sample | Rd | L | T | H |
|---|---|---|---|---|
| Film, Example I | 53.2 | 72.4 | 85.1 | 12.5 |
| Control film | 44.8 | 66.3 | 78.8 | 48.5 |

Rd and L=Black and White, higher values are lighter in color; T=Light Transmission, percent; H=Film Haze, percent reflected.

EXAMPLE V

A commercial polyurethane solution prepared according to the procedure disclosed of U.S. patent application Ser. No. 675,561, now U.S. Patent No. 3,142,652, was treated with sufficient secondary alkyl diamine with the alkyl radicals containing from 16–18 carbon atoms to give a film containing about 2% by weight of the secondary alkyl diamine and films were prepared by pouring the resulting polyurethane solution onto a glass plate and allowing the dimethyl formamide to evaporate. When these films were exposed for 500 hours in the Fadeometer it was found that the film prepared containing the 2% dialkyl diamine showed essentially no discolortaion while the film prepared from the solution that did not contain this additive had darkened appreciably.

Specific secondary dialkyl diamines that may be used in the procedures of these examples are:

N,N'-dihexadecyl-propane-1,3-diamine,
N,N'-diheptadecyl-propane-1,3-diamine,
N,N'-dioctadecyl-propane-1,3-diamine.

The conventional catalyst for the polyurethane reaction such as the tertiary amines and tin catalyst may be used to advantage in this invention to obtain the desired cure cycle.

Where the polyurethane reaction mixture is to be spread or sprayed on a surface to form thin films or built-up composite articles, it is desirable to use sufficient compatible volatile solvent to reduce this viscosity of the mixture to facilitate spreading, usually about 5 to 50% by weight of solvent may be used based on the polyester or polyether. Representative solvents are acetone, methyl ethyl ketone, methyl isobutyl ketone, the lower esters having less than about 6 carbon atoms, the lower nitroalkanes having less than about 5 carbon atoms, the lower hydrocarbons having less than about 10 carbon atoms and other inert solvents for alkyd resins.

What is claimed is:

1. A composition of matter comprising a mixture of a reactive hydrogen containing polymeric material having a molecular weight of about 1,500 to 3,000 selected from the class of polyester polyols and polyether polyols, and organic polyisocyanate, a primary diamine and at least one secondary diamine selected from the group consisting of N,N'-dihexadecyl-propane-1,3-diamine, N,N'-diheptadecyl-propane-1,3-diamine and N,N'-dioctadecyl-propane-1,3-diamine and at least about 1.1 to about 2 mols of polyisocyanate is used for each mol of reactive hydrogen containing polymeric material with the amount of primary diamine used being about 0.1 to about 0.9 mol per mol of excess organic polyisocyanate over that equivalent to the reactive hydrogen containing polymeric material and the secondary diamine is used in about 0.5 to 8 parts per 100 parts of reactive hydrogen containing polymeric material.

2. In a method of forming a shaped polyurethane the steps of (a) forming an isocyanate terminated prepolymer from a reactive hydrogen containing polymeric material having a molecular weight of about 500 to 8,000 selected from the class of polyester polyols and polyether polyols and an organic polyisocyanate, (b) reacting the prepolymer with a mixture of a primary diamine and a secondary diamine, said secondary diamine being present in about 0.5 to 8 parts per hundred parts of reactive hydrogen containing polymeric material and being selected from the group consisting of N,N'-dihexadecyl-propane-1,3-diamine, N,N' - diheptacedcyl - propane - 1,3-diamine and N,N' - dioctadecyl - propane - 1,3 - diamine and at least about 1.1 to about 2 mols of polyisocyanate is used for each mol of reactive hydrogen containing polymeric material with the amount of diamine used being up to an amount substantially equivalent to the excess polyisocyanate, applying the reaction mixture to a surface to form the shaped article.

3. In the method of claim 2, the improvement wherein the primary diamine and the secondary diamine are added simultaneously.

4. The method of claim 2 wherein the secondary diamine is N,N'-dihexadecyl-propane-1,3-diamine.

5. The method of claim 2 wherein the secondary diamine is N,N'-diheptadecyl-propane-1,3-diamine.

6. The method of claim 2 wherein the secondary diamine is N,N'-dioctyldecyl-propane-1,3-diamine.

7. The method of claim 2 wherein a compatible solvent is present in the reaction mixture to reduce the viscosity to facilitate spreading the reaction mixture on a surface.

References Cited

UNITED STATES PATENTS

| | | |
|---|---|---|
| 2,913,496 | 11/1959 | Cluff. |
| 3,180,854 | 5/1965 | Schneider et al. |
| 3,194,793 | 6/1965 | Kogon. |
| 3,198,863 | 8/1965 | Laner et al. |

DONALD E. CZAJA, *Primary Examiner.*

H. S. COCKERAM, *Assistant Examiner.*

U.S. Cl. X.R.

260—77.5